United States Patent
Yamamoto et al.

(10) Patent No.: US 11,400,583 B2
(45) Date of Patent: Aug. 2, 2022

(54) ROBOT

(71) Applicant: Seiko Epson Corporation, Tokyo (JP)

(72) Inventors: Sota Yamamoto, Matsumoto (JP);
Yasutomo Takahashi, Matsumoto (JP);
Masahiko Kobayashi, Chino (JP);
Daisuke Komatsu, Suwa (JP); Toshio Tanaka, Azumino (JP)

(73) Assignee: Seiko Epson Corporation

( * ) Notice: Subject to any disclaimer, the term of this patent is extended or adjusted under 35 U.S.C. 154(b) by 209 days.

(21) Appl. No.: 16/857,247

(22) Filed: Apr. 24, 2020

(65) Prior Publication Data
US 2020/0338720 A1 Oct. 29, 2020

(30) Foreign Application Priority Data
Apr. 25, 2019 (JP) .............................. JP2019-083708

(51) Int. Cl.
*B25J 19/00* (2006.01)
*B25J 9/00* (2006.01)
*B25J 13/08* (2006.01)

(52) U.S. Cl.
CPC ........... *B25J 9/0081* (2013.01); *B25J 13/085* (2013.01); *B25J 19/0075* (2013.01)

(58) Field of Classification Search
CPC .... B25J 19/0075; B25J 13/085; B25J 9/0081; B25J 19/0091; B25J 9/1664; B25J 9/044; B25J 9/1674; B25J 9/023; B25J 9/1697; B25J 13/089; B25J 15/0019; B25J 9/1653; B25J 19/023; G01B 5/008; G01B 11/002; G05B 2219/39045; G05B 2219/39008; G05B 2219/37098
See application file for complete search history.

(56) References Cited

U.S. PATENT DOCUMENTS

| | | | |
|---|---|---|---|
| 2010/0050806 A1* | 3/2010 | Ono | B25J 9/044 74/490.02 |
| 2017/0120458 A1* | 5/2017 | Akaha | B25J 9/0018 |
| 2018/0056506 A1* | 3/2018 | Nishimura | B25J 9/0009 |
| 2018/0129184 A1* | 5/2018 | Shimodaira | B25J 13/085 |
| 2018/0161991 A1* | 6/2018 | Hoshino | B25J 9/044 |

(Continued)

FOREIGN PATENT DOCUMENTS

| | | |
|---|---|---|
| JP | 2000-141041 A | 5/2000 |
| JP | 2018-530442 A | 10/2018 |
| JP | 2018-176292 A | 11/2018 |

OTHER PUBLICATIONS

Gulzar et al., Kinematic modeling and simulation of an economical SCARA manipulator by Pro-E and verification using MATLAB/Simulink, 2015, IEEE, p. 102-107 (Year: 2015).*

(Continued)

*Primary Examiner* — McDieunel Marc
(74) *Attorney, Agent, or Firm* — Harness, Dickey & Pierce, P.L.C.

(57) ABSTRACT

A robot is provided. The robot includes an arm configured to turn around a turning axis and a cover including a first member having first rigidity and a second member having second rigidity higher than the first rigidity, the cover being provided on the arm, the second member being located in a position closer to the turning axis than the outermost periphery of the first member in a plan view from a direction of the turning axis.

7 Claims, 4 Drawing Sheets

(56) References Cited

U.S. PATENT DOCUMENTS

2018/0297192 A1   10/2018  Haddadin
2019/0129374 A1*  5/2019  Miyamoto ........... G05B 19/401
2019/0329423 A1*  10/2019  Shimodaira ............. B25J 13/06
2020/0338757 A1*  10/2020  Iwazaki ................... B25J 9/041
2021/0162601 A1*  6/2021  Atherton ............. G01B 11/002

OTHER PUBLICATIONS

Fujioka et al., Proposal of tendon-driven elastic telescopic arm and initial bending experiment, 2017, IEEE, p. (Year: 2017).*

Liang et al., Accuracy analysis of SCARA industrial robot based on screw theory, 2011, IEEE, p. (Year: 2011).*

Wallet etaal., Reactive agent based planning for an avatar, 1999, IEEE, p. (Year: 1999).*

\* cited by examiner

ROBOT

The present application is based on, and claims priority from JP Application Serial Number 2019-083708, filed Apr. 25, 2019, the disclosure of which is hereby incorporated by reference herein in its entirety.

BACKGROUND

1. Technical Field

The present disclosure relates to a robot.

2. Related Art

JP A-2018-176292 (Patent Literature 1) proposes a technique in which a robot and an operator perform work in cooperation with each other in the same work space. In the technique disclosed in Patent Literature 1, a soft member is disposed on the surface of an arm in order to improve safety for the object present around the robot.

However, in the robot disclosed in Patent Literature 1, some region is not covered by the soft member. If the region not covered by the soft member comes into contact with the object present around the robot, the object is likely to be broken.

SUMMARY

According to an aspect of the present disclosure, a robot is provided. The robot includes an arm on which a cover is provided, the arm turning around a turning axis. The cover includes a first member having first rigidity and a second member having second rigidity higher than the first rigidity. The second member is located further on the turning axis side than a part in an outermost periphery of the first member when viewed from a direction of the turning axis.

DESCRIPTION OF EXEMPLARY EMBODIMENTS

A. First Embodiment

A1. Configuration of a Robot System

Figure 1:
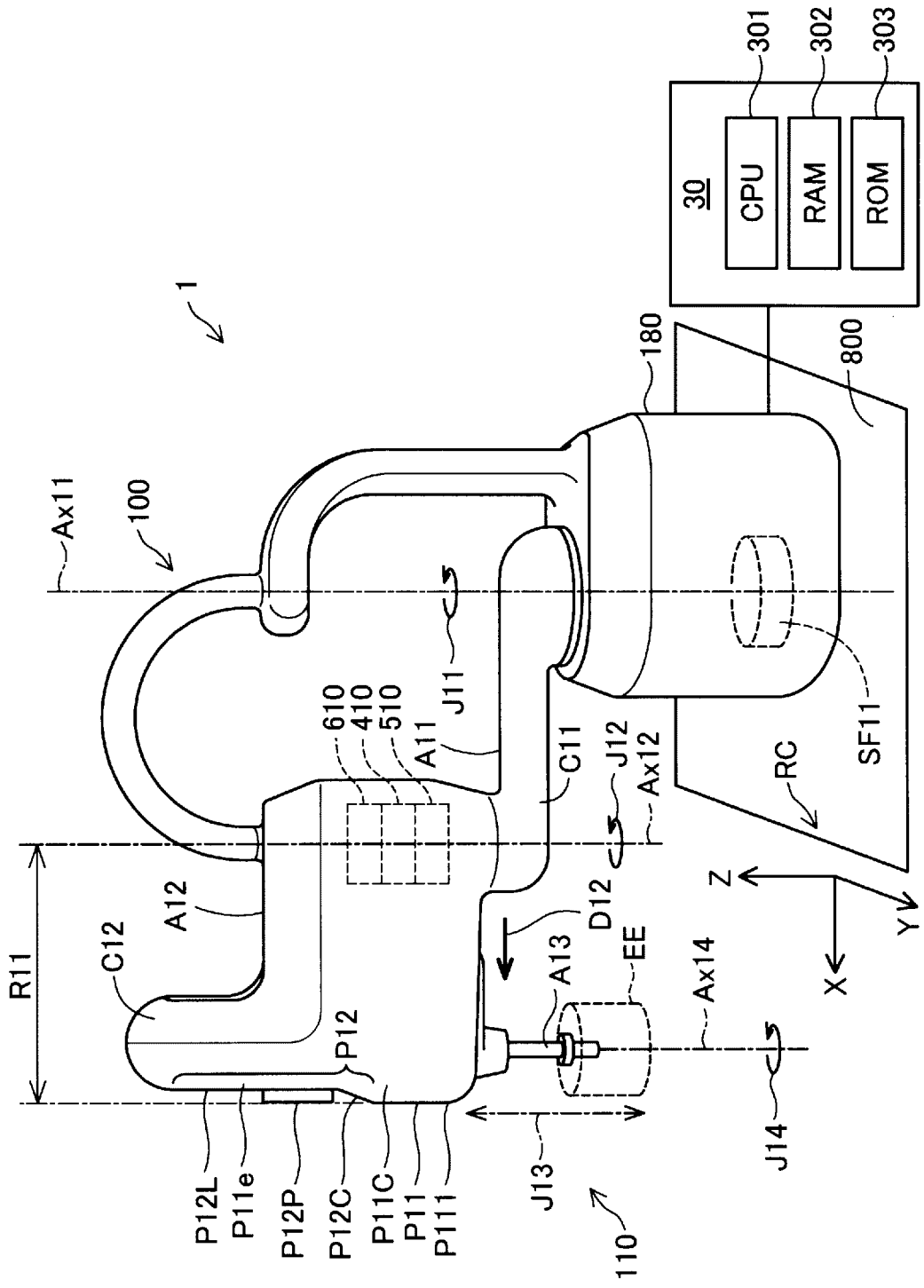
FIG. 1 is an explanatory diagram showing a robot system in a first embodiment.

FIG. 1 is an explanatory diagram showing a robot system 1 in a first embodiment. The robot system 1 in this embodiment includes a robot 100, an operation control device 30, and an end effector EE. In FIG. 1, a robot coordinate system RC is shown in order to facilitate understanding of a technique. The robot coordinate system RC is a three-dimensional orthogonal coordinate system defined by an X axis and a Y axis orthogonal to each other on the horizontal plane and a Z axis having a positive direction in the vertical upward direction.

The robot 100 is a SCARA robot. In this specification, a "SCARA robot" is a so-called horizontal articulated robot and is a robot including a plurality of arm elements configuring an arm and configured to turn around turning axes in directions parallel to one another and not including an arm element having a turning axis in a direction perpendicular to the turning axes of the plurality of arm elements.

The robot 100 is a four-axis robot including an arm 110 including four joints J11 to J14. The arm 110 is supported by a base 180 via the joint J11. The arm 110 can move the end effector EE attached to the distal end of the arm 110. In this embodiment, "movement" includes a change in a position and a change in a posture. In FIG. 1, the end effector EE is shown in a simple columnar shape in order to facilitate understanding of the technique.

In the arm 110, the joints J11, J12, and J14 are rotary joints having turning axes in a direction parallel to the Z-axis direction of the robot coordinate system RC. The joint J13 is a linear motion joint that moves in the direction parallel to the Z-axis direction. The center axes of turning of the joints J11, J12, and J14 are shown as turning axes Ax11, Ax12, and Ax14 in FIG. 1.

A constituent element between joints adjacent to each other among the plurality of joints configuring the arm 110 is referred to as "arm element" in this specification. In FIG. 1, an arm element A11 between the joint J11 and the joint J12, an arm element A12 between the joint J12 and the joint J13, and an arm element A13 configuring the distal end of J13, and moved by the joints J13 and J14 are respectively added with the signs A11, A12, and A13 and shown.

The arm element A11 is coupled to the base 180 via the joint J11. The arm element A11 turns around the turning axis Ax11. The arm element A12 turns around the turning axis Ax12. The arm element A13 turns around the turning axis Ax14. The arm element A13 moves in a direction parallel to the turning axis Ax12 and the turning axis Ax14. In this specification, "parallel" includes a range of a direction up to ±2° with respect to complete parallelism.

The robot 110 includes servomotors 410, speed reducers 510, and torque sensors 610 respectively in the joints J11 to J14. The servomotors 410 are controlled by the operation control device 30 to rotate output shafts of the servomotors 410. The speed reducers 510 decelerate the rotation of the output shafts of the servomotors 410 and transmit the decelerated rotation to the arm element. The torque sensors 610 detect torque received by the rotary joints J11, J12, and J14 from the outside. In FIG. 1, the servomotor 410, which drives the joint J12, the speed reducer 510, and the torque sensor 610 are added with the signs and shown.

The robot 100 can arrange, by turning or linearly moving the joints J11 to J14 with the servomotors respectively provided in the joints, the end effector EE, which is attached to the distal end portion of the arm 110, in a designated position in a three-dimensional space in a designated posture. A point representing the position of the end effector EE in the three-dimensional space, that is, a control point is referred to as TCP (Tool Center Point) as well.

The base 180 is fixed to a floor section 800 and supports the arm 110. A force detecting section SF11 is provided in the base 180. More specifically, the force detecting section SF11 is located between the base 180 and the floor section 800. The force detecting section SF11 is a force sensor including a quartz piezoelectric element. The force detecting section SF11 can detect force directly or indirectly applied to the arm 110. In this specification, "force" includes linearly acting force and torque. In this specification, a "direction" of the force includes a linear direction and a rotational direction.

The force detecting section SF11 can detect forces in three axial directions of the X axis, the Y axis, and the Z axis applied from the outside, that is, a component other than the force detecting section SF11 and torques around a U axis, which is a rotation axis corresponding to the X axis, a V axis, which is a rotation axis corresponding to the Y axis, and a W axis, which is a rotation axis corresponding to the Z axis. As a result, the force detecting section SF11 can measure the forces in the three axial directions of the X axis, the Y axis, and the Z axis acting on the arm 110, which is a component other than the force detecting section SF11, and the torques around the U axis, the V axis, and the W axis. An output of the force detecting section SF11 is transmitted to the operation control device 30 and used to control the robot 100.

The floor section 800 supports the base 180 via the force detecting section SF11. The floor section 800 is a floor of a factory in which the robot 100 is set. In FIG. 1, the floor section 800 is shown as a rectangular plane in order to facilitate understanding of the technique.

The end effector EE is attached to the distal end of the arm 110. The end effector EE is controlled by the operation control device 30 and can grip a workpiece, which is an object of work, and can release the gripped workpiece. As a result, for example, the end effector EE and the robot 100 are controlled by the operation control device 30 and can grip and move the workpiece. In FIG. 1, illustration of the workpiece is omitted and the end effector EE is shown in a simple columnar shape in order to facilitate understanding of the technique.

The operation control device 30 is a control device that controls the operation of the robot 100. The operation control device 30 is coupled to the robot 100. The operation control device 30 includes a CPU (Central Processing Unit) 301, which is a processor, a RAM (Random Access Memory) 302, and a ROM (Read-Only Memory) 303. A control program for controlling the robot 100 is installed in the operation control device 30. In the operation control device 30, the CPU 301, the RAM 302, and the ROM 303, which are hardware resources, and the control program cooperate. Specifically, the CPU 301 realizes various functions by loading, on the RAM 302, computer programs stored in the ROM 303 and executing the computer programs. In this specification, the operation control device 30 and the robot 100 are sometimes collectively referred to as "robot" in a broad sense. When the robot 100 is a SCARA robot, the operation control device 30 and the robot 100 are collectively referred to as "SCARA robot" in a broad sense.

A2. Operation Modes of the Robot System

A control point is taught to the robot system 1 by direct teach. The robot system 1 has a normal operation mode in which work is performed based on teaching and a teaching operation mode in which teaching is performed. The robot system 1 further has, as the teaching operation mode, a teaching operation mode by direct teach and a teaching operation mode by a teaching pendant, which is a tool that transmits a teaching point to the operation control device 30.

In the teaching by the direct teach, a teacher arranges a control point of the robot 100 in a target position by applying an external force to the end effector EE and the arm element A12. The teacher teaches the position to the operation control device 30 as a teaching point via a teaching operation section TC10 explained below. The external force applied to the end effector EE or the robot 100 is detected by the force detecting section SF11. Processing in which the robot system 1 is taught in the direct teach is executed by the CPU 301 of the operation control device 30 based on an output from the force detecting section SF11.

In the teaching by the teaching pendant, the teacher arranges the control point of the robot 100 in a target position via a not-shown teaching pendant. The teacher teaches the position to the operation control device 30 as a teaching point via the teaching pendant. Processing in which the robot system 1 is taught via the teaching pendant is executed by a CPU of the not-shown teaching pendant and the CPU 301 of the operation control device 30.

A3. Configuration of a Cover of the Arm

A cover is provided on the arm 110. Specifically, the arm element A11 is covered by a cover C11. The arm element A12 is covered by a cover C12. In this specification, a "cover" is a member arranged around a member for maintaining the posture of the arm 110 and exposed to the surface of the member. The cover does not always need to be easily removed from the member for maintaining the posture of the arm 110. The member for maintaining the posture of the arm 110 is formed of, for example, an aluminum alloy. In this specification, a member covered by the "cover" among components of the arm 110 is referred to as "arm" in a narrow sense.

The cover C12 of the arm element A12 includes a first member P11 and a second member P12. The first member P11 has predetermined first rigidity. The second member P12 has second rigidity higher than the first rigidity. When the same external force is applied to parts corresponding to each other of samples having the same shape formed of materials forming the respective members, the samples are deformed. The magnitude of "rigidity" in this specification is determined by the magnitude of an amount of the deformation. Specifically, the first member P11 is mainly formed of urethane foam and the second member P12 is mainly formed of ABS resin.

The second member P12 is located further on the turning axis Ax12 side than a part P111 in the outermost periphery of the first member P11 when viewed from the direction of the turning axis Ax12, that is, in a position closer to the turning axis Ax12 than the part P111 (see the upper left part of FIG. 1). In this specification, "a part in the outermost periphery of a member" means, among parts of the member, a part where the distance from the center axis of rotation of rotational movement of the member is the longest. The center axis of rotation of rotational movement of the first member P11 and the second member P12 of the arm element A12 is a turning axis Ax12. In this specification, a state viewed from the direction of a turning axis is referred to a state in "a plan view from a position along a turning axis" as well.

By adopting such a configuration, when the arm element A12 is brought into contact with another object by the turning of the arm element A12 around the turning axis Ax12, likelihood that the first member P11 comes into contact with the other object can be set higher than likelihood that the second member P12 comes into contact with the other object. As a result, in the SCARA robot 100 including, in a part thereof, the second member P12 formed of a material having high rigidity, it is possible to reduce likelihood that an object present around the SCARA robot 100 is broken.

The second member P12 includes a plane P12L, a projecting part P12P, and a bending part P12C. The plane P12L is a surface that can be visually recognized when the arm 110 is viewed along the opposite direction of a direction D12 in which the arm 110 extends from the turning axis Ax12. The plane P12L is a plane substantially perpendicular to the direction D12 in which the arm 110 extends from the turning axis Ax12. The projecting part P12P projects toward the direction D12 away from the turning axis Ax12 compared with the plane P12L surrounding the projecting part P12P. The projecting part P12P has a substantially truncated cone shape, a side surface of which has a shape convex toward the inner side and a curvature radius of which decreases further away from the turning axis Ax12. The bending part P12C is a curved surface that is coupled to the end in the Z-axis negative direction of the plane P12L and is further away from the turning axis Ax12 as being closer to the part P111 in the outermost periphery of the first member P11, that is, projecting in the direction D12 as being closer to the part P111 in the outermost periphery of the first member P11. A part including the end in the Z-axis positive direction of the plane P12L is not a curved surface and is a plane (see the upper left part of FIG. 1).

Figure 2:
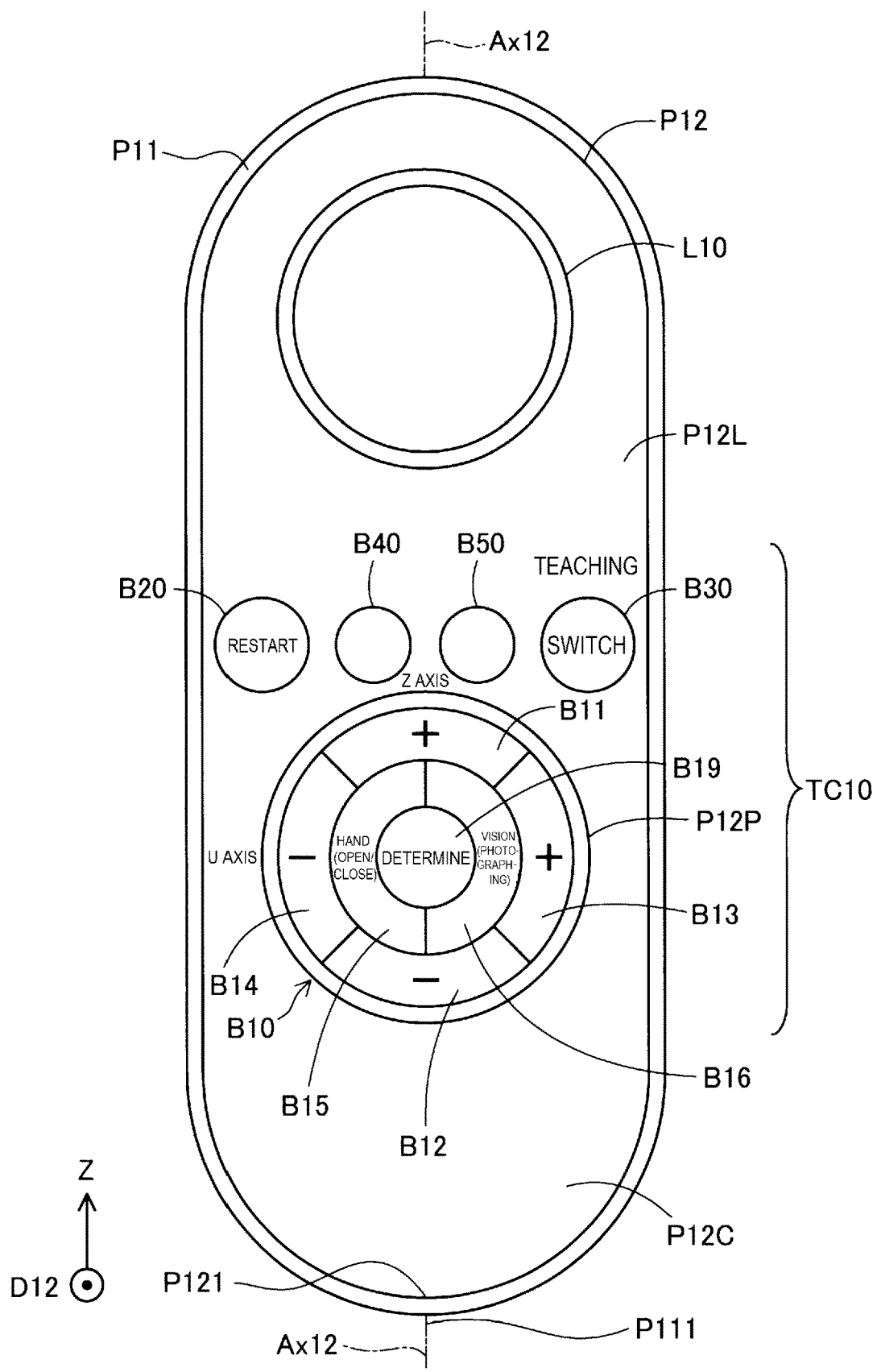
FIG. 2 is a front view of a second member.

FIG. 2 is a front view of the second member P12. The second member P12 has an elliptical external shape long along the direction parallel to the turning axis Ax12 when viewed along the opposite direction of the direction D12. The outer circumference of the second member P12 is surrounded by the first member P11 when viewed along the opposite direction of the direction D12. The second member P12 includes a light emitting section L10 and the teaching operation section TC10.

The light emitting section L10 can selectively emit light in green or in orange. Specifically, the light emitting section L10 is a ring-shaped LED. The light emitting section L10 is provided in a position close to, of both ends in the longitudinal direction of the second member P12, the end on the Z-axis positive direction side. The light emitting section L10 is lit in green when the robot system 1 is operating in the teaching operation mode by the direct teach. The light emitting section L10 is lit in orange when the robot system 1 is operating in an operation mode other than the teaching operation mode by the direct teach and the servomotors of the joints J11 to J14 are on.

The teaching operation section TC10 is an operation section used to teach the position of a control point. More specifically, the teaching operation section TC10 is a user interface used to perform various kinds of operation such as operation for shifting to the operation mode of the direct teach and operation for performing teaching in the operation mode of the direct teach. The teaching operation section TC10 is provided in a position on the Z-axis negative direction side with respect to the light emitting section L10.

Since the teaching operation section TC10 is provided in the arm 110, the following effects are obtained. In the teaching by the direct teach, the teacher can easily perform teaching by operating the teaching operation section TC10 provided in the arm 110 after applying an external force to the end effector EE and the arm element A12 and arranging the control point of the robot 100 in a target position.

The teaching operation section TC10 is desirably formed of a material having rigidity higher than the rigidity of the material forming the first member P11 in order to clearly specify that ON operation is executed. Accordingly, by adopting the configuration explained above, when rotation of the arm element A12 around the turning axis Ax12 is performed, likelihood that the teaching operation section TC10 having the high rigidity comes into contact with another object can be set low compared with likelihood that the first member P11 having the lower rigidity comes into contact with the other object. As a result, in the SCARA robot 100, it is possible to reduce likelihood that an object present around the SCARA robot is broken.

The teaching operation section TC10 includes a button group B10 and buttons B20, B30, B40, and B50.

The button group B10 is provided on an end face of the substantially truncated cone-shaped projecting part P12P (see the upper left part of FIG. 1). With such a configuration, a user operates the button group B10 of the teaching operation section TC10 provided on the end face of the projecting part P12P projecting toward the user. As a result, the user can easily perform operation when teaching a position to the SCARA robot 100.

The button group B10 includes movement buttons B11, B12, B13, and B14, a hand button B15, a vision button B16, and a determination button B19.

The movement button B11 is a button for moving the joint J13 and moving the control point in the Z-axis positive direction in teaching the control point to the robot 100 (see J13 in FIG. 1). The movement button B12 is a button for moving the joint J13 and moving the control point in the Z-axis negative direction in teaching the control point to the robot 100 (see J13 in FIG. 1).

The movement buttons B13 and B14 are buttons for moving the joint J14 and rotationally moving the control point in teaching the control point to the robot 100 (see J14 in FIG. 1). When the movement button B13 is pressed, the control point rotates in the opposite direction of a direction in which a right-handed screw rotates toward the Z-axis negative direction. When the movement button B14 is pressed, the control point rotates in the direction in which the right-handed screw rotates toward the Z-axis negative direction.

The hand button B15 is a button for opening and closing the end effector EE in teaching the control point to the robot 100. Every time the hand button B15 is pressed, the end effector EE alternately takes an open state and a closed state.

The vision button B16 is a button for teaching a teaching point for causing the robot 100 to perform photographing with a camera provided in the end effector EE in teaching the control point to the robot 100.

The determination button B19 is a button for teaching the operation control device 30 that the position of the control point at the time when the determination button B19 is turned on is set as the teaching point. When the determination button B19 is turned on, the position of the control point at that time is registered as the teaching point. Information concerning the position of the teaching point is stored in the RAM 302 of the operation control device 30.

The button B20 is a button for causing the robot 100 to resume operation when the arm 110 comes into contact with another object during the operation of the robot 100 and the robot 100 emergently stops. The contact of the arm 110 with the other object is detected by the CPU 301 based on a signal output from the force detecting section SF11 (see the lower right part of FIG. 1).

The button B30 is a button used to switch the operation mode of the direct teach and the teaching operation mode by the teaching pendant. Every time the button B30 is pressed, the robot 100 alternately operates in the operation mode of the direct teach and the teaching operation mode by the teaching pendant. In the teaching operation mode by the direct teach, the light emitting section L10 is lit in green (see the upper part of FIG. 2). In the teaching operation mode by the teaching pendant, the light emitting section L10 is lit in orange.

With such a configuration of the button B30 provided in the projecting part P12P, the user can operate the button B30 to start the operation mode for performing the direct teach and, in the operation mode for performing the direct teach, hold the projecting part P12P projecting compared with the plane P12L around the projecting part P12P, arrange the control point of the arm 110 in a desirable position, and perform teaching. As a result, operation in teaching a position to the SCARA robot 100 is facilitated.

The buttons B40 and B50 are buttons in which the user can optionally set functions.

Figure 3:
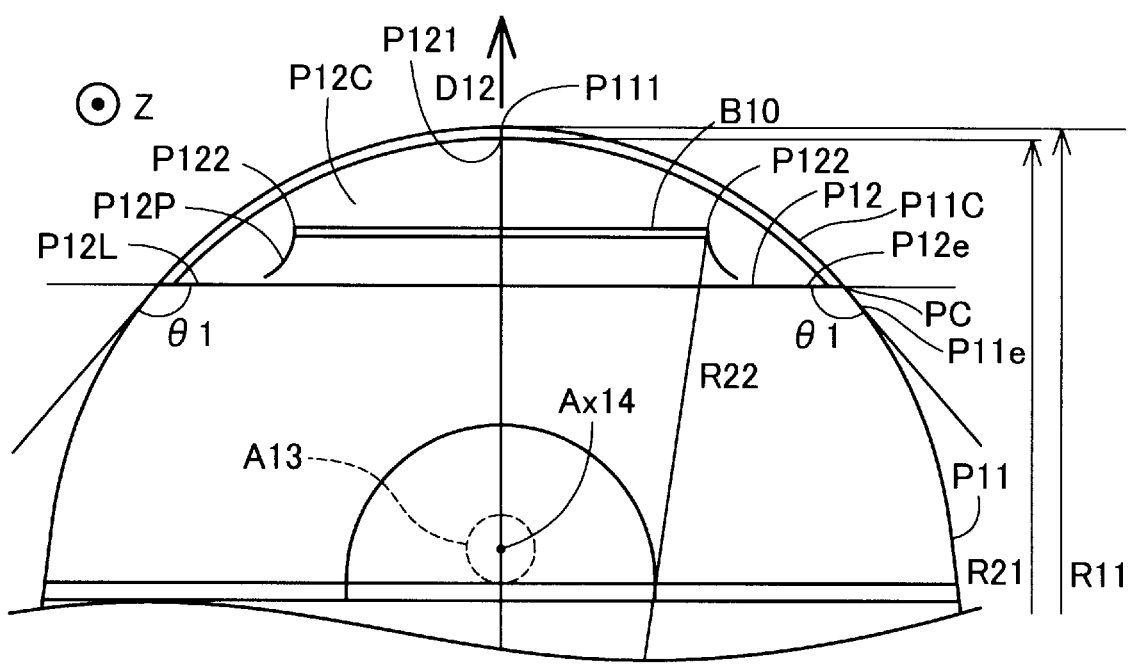
FIG. 3 is a plan view of the distal end portion of an arm element viewed toward a Z-axis negative direction.

FIG. 3 is a plan view of the distal end portion of the arm element A12 viewed toward the Z-axis negative direction. In FIG. 3, the plane P12L of the second member P12 is represented as a line segment extending in the lateral direction. The substantially truncated cone-shaped projecting part P12P is shown on the line segment representing the plane P12L. The bending part P12C is shown on the positive direction side of the direction D12 of the projecting part P12P.

As shown in FIG. 3, the outer contour of the first member P11 surrounds the components of the second member P12. The outer contour of the first member P11 surrounding the components of the second member P12 draws a curve P11C. By adopting such a configuration, it is possible to reduce likelihood that an object present around the SCARA robot 100 is broken by the first member P11 or the second member P12.

A distance R11 between the part P111 in the outermost periphery of the first member P11 and the turning axis Ax12, which is the center axis of the rotational movement of the arm element A12 including the first member P11, is longer than a distance R21 between a part P121 in the outermost periphery of the second member P12 and the turning axis Ax12 (see the lower right part of FIG. 3). In other words, the second member P12 is located further on the turning axis Ax12 side than the part P111 in the outermost periphery of the first member P11 when viewed from the direction of the turning axis Ax12.

The distance R11 between the part P111 in the outermost periphery of the first member P11 and the turning axis Ax12 is longer than a distance R22 (see the middle right part of FIG. 3) between a part P122 in the outermost periphery of the projecting part P12P and the turning axis Ax12. In other words, the projecting part P12P is located further on the turning axis Ax12 side than the part P111 in the outermost periphery of the first member P11 when viewed from the direction of the turning axis Ax12. The distance R22 is shorter than the distance R21.

By adopting such a configuration, when the arm element A12 is brought into contact with another object by the turning of the arm element A12 around the turning axis Ax12, likelihood that the other parts P12L and P12C of the second member P12 and the first member P11 come into contact with the other object is higher than likelihood that the projecting part P12P comes into contact with the other object. As a result, in the SCARA robot 100 including the projecting part P12P, it is possible to reduce likelihood that an object present around the SCARA robot 100 is broken by the projecting part P12P.

The second member P12 is located between the arm element A13 and the part P111 in the outermost periphery of the first member P11 when viewed from the direction of the turning axis Ax12 (see the center of FIG. 3).

With such a configuration, the user can easily visually recognize the second member P12 from the outside of a reachable range of the distal end P111 of the arm 110 irrespective of an angle position of the arm 110. The user can touch the second member P12 without moving to a position between the distal end P111 of the arm 110 and the base 180 of the SCARA robot 100. Accordingly, in a form in which the teaching operation section TC10 is provided in the second member P12, information can be easily exchanged between the SCARA robot 100 and the user via the teaching operation section TC10.

The arm element A12 includes a coupling part PC where an end portion P11e of the curve P11C at the outer contour of the first member P11 and an end portion P12e of the second member P12 opposed to each other cross at an angle θ1 larger than 90° (see the middle right part and the left part of FIG. 3). In this specification, the term "cross" about two surfaces A and B is used to describe the two surfaces A and B that are in direct contact and is also used to describe relative angles of end portions of the two surfaces A and B arranged across another surface C. An angle formed by the end portion P11e of the curve P11C at the outer contour of the first member P11 and the end portion P12e of the second member P12 is an angle formed by a tangential line of the end portion P11e of the curve P11C at the outer contour of the first member P11 and a tangential line of the end portion P12e of the second member P12 in the coupling part PC and is an angle on a side where the first member P11 and the second member P12 are located. The angle θ1 formed by the end portion P11e of the curve P11C at the outer contour of the first member P11 and the end portion P12e of the second member P12 is measured on a plane where the angle formed by the end portion P11e of the curve P11C at the outer contour of the first member P11 and the end portion P12e at the second member P12 is the smallest in a three-dimensional space.

By adopting such a configuration, it is possible to reduce likelihood that an object present around the SCARA robot 100 is broken by the coupling part PC of the end portion P11e of the curve P11C at the outer contour of the first member P11 and the end portion P12e of the second member P12.

The button B30 in this embodiment is referred to as "operation section" as well. The arm element A13 is referred to as "shaft" as well. The arm element A12, which is a part of the arm 110, is referred to as "arm" in a broad sense as well. The position of the control point is referred to as "position of the arm" as well.

B. Second Embodiment

Figure 4:
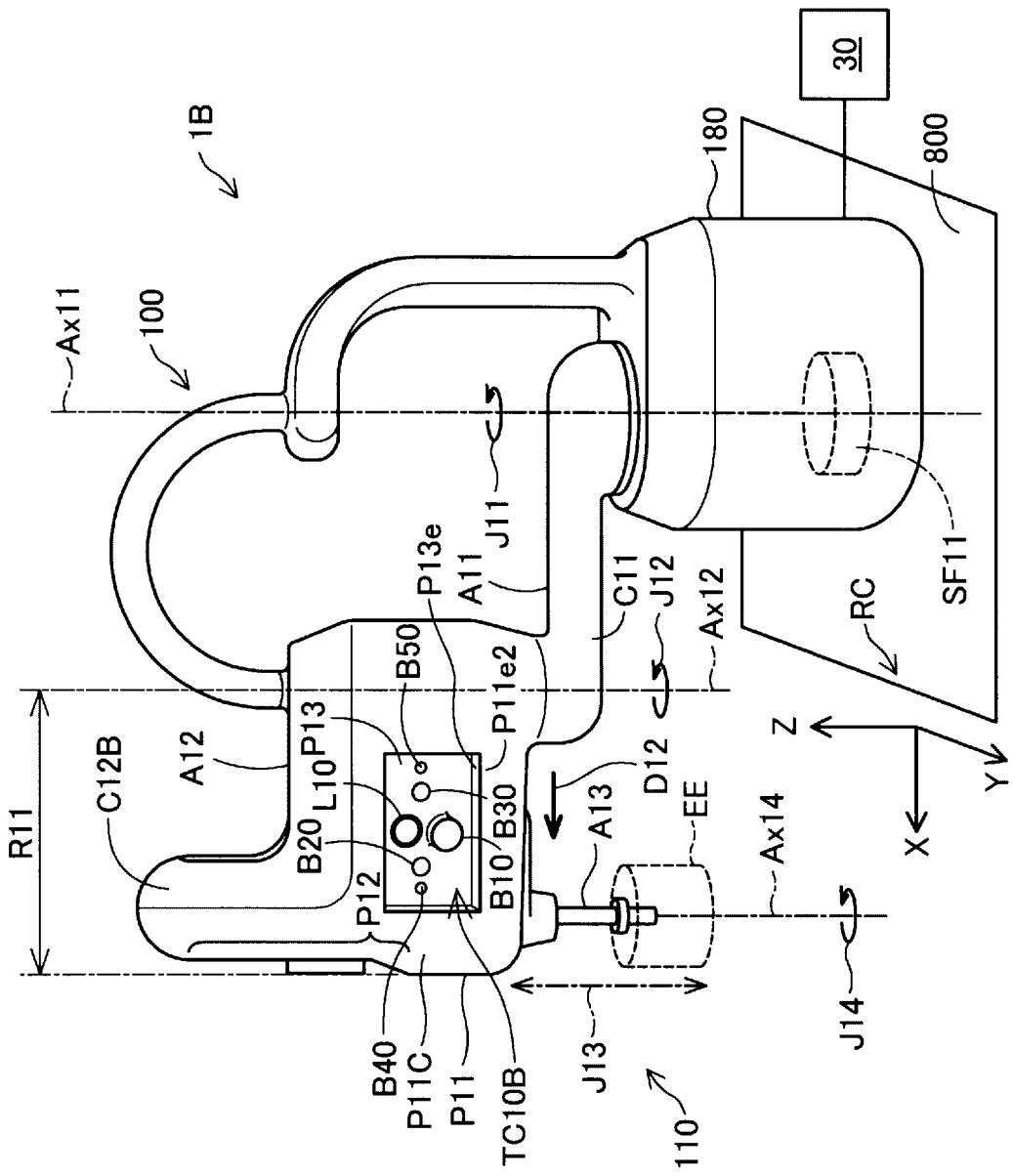
FIG. 4 is an explanatory diagram showing a robot system in a second embodiment.

FIG. 4 is an explanatory diagram showing a robot system 1B in a second embodiment. The robot system 1B in the second embodiment includes a cover C12B for the arm element A12 and further includes a third member P13. Otherwise, the robot system 1B in the second embodiment is the same as the robot system 1 in the first embodiment.

The third member P13 has second rigidity higher than first rigidity. Specifically, the third member P13 is formed of the same material as the second member P12.

The third member P13 is located further on the turning axis Ax12 side than the part P111 (see FIGS. 1 and 3) in the outermost periphery of the first member P11 when viewed from the direction of the turning axis Ax12. More specifically, the third member P13 is provided in a concave shape on a side surface of the arm element A12. The "side surface" of the arm element A12 is a surface extending along the direction D12 among surfaces forming the surface of the arm element A12 and is a surface having a smaller angle with respect to a plane defined by the direction D12 and the Z axis than an angle with respect to a plane defined by the X axis and the Y axis.

By adopting such a configuration, when the arm element A12 is brought into contact with another object by the turning of the arm element A12 around the turning axis Ax12, likelihood that the first member P11 comes into contact with the other object can be set higher than likelihood that the third member P13 comes into contact with the other object. As a result, in the SCARA robot 100 including, in a part, the third member P13 formed of a material having high rigidity, it is possible to reduce likelihood that an object present around the SCARA robot 100 is broken.

The surface of the first member P11 forming the surface of the side surface of the arm element A12 is a substantial plane. The third member P13 is recessed to define a substantially rectangular parallelepiped space on the inner side from the surface of the side surface of the arm element A12. As a result, an end portion P11e2 of the first member P11 forming the surface of the side surface of the arm element A12 and an end portion P13e of the third member P13 are coupled at 90°.

By adopting such a configuration, it is possible to reduce likelihood that an object present around the SCARA robot 100 comes into contact with the third member P13.

The third member P13 includes the light emitting section L10 and a teaching operation section TC10B. As shown in FIGS. 3 and 2, relative disposition of the light emitting section L10 and the teaching operation section TC10B in the robot system 1B in the second embodiment is different from the relative disposition of the light emitting section L10 and the teaching operation section TC10 in the robot system 1 in the first embodiment. Otherwise, the light emitting section L10 and the teaching operation section TC10B in the robot system 1B in the second embodiment is the same as the light emitting section L10 and the teaching operation section TC10 in the robot system 1 in the first embodiment.

The teaching operation section TC10B includes the button group B10 and the buttons B20, B30, B40, and B50. Configurations and functions of the light emitting section L10, the button group B10, and the buttons B20, B30, B40, and B50 in the second embodiment are the same as the configurations and the functions of the light emitting section L10, the button group B10, and the buttons B20, B30, B40, and B50 in the first embodiment.

As a result, the light emitting section L10 and the teaching operation section TC10B in the robot system 1B achieve the same effects as the effects of the light emitting section L10 and the teaching operation section TC10 in the robot system 1 in the first embodiment.

The third member P13 and the second member P12 in this embodiment are collectively referred to as "second member" in a broad sense as well.

C. Other Embodiments

The present disclosure is not limited to the embodiments explained above and can be realized by various aspects in a range not departing from the gist of the present disclosure. For example, the present disclosure can also be realized by the following aspects. Technical features in the embodiments corresponding to technical features in the aspects described below can be replaced or combined as appropriate in order to solve a part or all of the problems of the present disclosure or achieve a part or all of the effects of the present disclosure. If the technical features are not explained in this specification as essential technical features, the technical features can be deleted as appropriate.

C1. Another Aspect 1

(1) In the embodiments, the first member P11 is formed of the urethane foam and the second member P12 is formed of the ABS resin. However, the first member P11 can also be formed of another material such as silicon rubber. The first member P11 formed of the urethane foam is excellent in chemical resistance. A cover for the first member P11 can be reduced in weight compared with the silicon rubber. The second member P12 can also be formed of another material such as polypropylene or PET. The second member desirably has second rigidity higher than first rigidity.

(2) In the second embodiment, the third member P13 is formed of the same material as the second member P12. However, the third member P13 can also be formed of a material different from the second member P12. Each of the first member P11, the second member P12, and the third member P13 can be formed of a plurality of materials. When each of the first member P11, the second member P12, and the third member P13 can be formed of a plurality of materials, the rigidity of the members are the rigidity of a material forming a largest volume portion among the members.

C2. Another Aspect 2

In the embodiments, the second member P12 includes the light emitting section L10 and the teaching operation section TC10 (see FIG. 2). However, the second member P12 can also be a member including the light emitting section L10 and not including the teaching operation section TC10. The light emitting section L10 includes a member that transmits light. The member, which transmits light and has a less change over time, sometimes has high rigidity. Accordingly, if the second member P12 includes the light emitting section L10, it is possible to reduce likelihood that an object present around the SCARA robot is broken by such a member having high rigidity. Further, the second member P12 can also be a member not including both of the light emitting section L10 and the teaching operation section TC10 and includes other components.

C3. Another Aspect 3

(1) In the embodiments, the button group B10 of the teaching operation section TC10 is provided on the end face of the substantially truncated cone-shaped projecting part P12P (see the upper left part of FIG. 1 and the lower part of FIG. 2). However, the entire teaching operation section TC10 may be provided on the end face of the projecting part P12P. The teaching operation section TC10 may not be provided on the end face of the projecting part P12P. For example, the button group B10 may be provided on the plane P12L of the second member P12.

(2) In the embodiments, the projecting part P12P has the substantially truncated cone shape, the side surface of which has the shape convex toward the inner side (see the upper left part of FIG. 1 and the lower part of FIG. 2). However, the projecting part P12P can also be received when the projecting part P12P has another shape such as a columnar shape. The projecting part desirably projects toward the direction in which the arm extends from the turning axis compared with the part surrounding the projecting part.

C4. Another Aspect 4

(1) In the embodiments, the force detecting section SF11 is provided in the base 180 (see FIG. 1). However, the force detecting section SF11 may be provided in another part such as the distal end of the arm. It is also possible to cause the torque sensors 610 provided in the joints to function as force detecting sections to perform the direct teach.

(2) In the embodiments, the teaching operation section TC10 includes the button B30 for staring the operation mode for performing the direct teach. However, the teaching operation section TC10 may not include an operation section that starts the operation mode for performing the direct teach. The operation section that starts the operation mode for performing the direct teach may be provided in another part.

C5. Another Aspect 5

In the first embodiment, the entire second member P12 is located between the arm element A13 and the part P111 in the outermost periphery of the first member P11 when viewed from the direction of the turning axis Ax12 (see FIG. 3). However, as in the robot system 1B in the second embodiment, a part of the member having the second rigidity higher than the first rigidity of the first member may be provided in another position such as a position further on the turning axis Ax12 side than the arm element A13 (see P13 in FIG. 4).

The entire second member P12 may be provided in, when viewed from the direction of the turning axis Ax12, a position that is not the position between the arm element A13 and the part P111 in the outermost periphery of the first member P11.

C6. Another Aspect 6

In the first embodiment, the arm element A12 includes the coupling part PC where the end portion P11e of the first member P11 and the end portion P12e of the second member P12 adjacent to each other cross at the angle θ1 larger than 90° (see the middle right part and the left part of FIG. 3). However, the arm element A12 may not include the coupling part PC where the end portion P11e of the first member P11 and the end portion P12e of the second member P12 cross at the angle θ1 larger than 90° in the first embodiment. For example, in the second embodiment, the arm element A12 may include the first member P11 and the third member P13 and may not include the second member P12.

The arm element A12 may include a coupling part where the end portion P11e of the first member P11 and the end portion P12e of the second member P12 cross at an angle equal to or smaller than 90° in a plan view from the position along the turning axis Ax12. By adopting such a configuration, it is possible to reduce likelihood that an object present around the SCARA robot 100 comes into contact with the second member P12.

C7. Another Aspect 7

In the second embodiment, the end portion P11e2 of the first member P11 forming the surface of the side surface of the arm element A12 and the end portion P13e of the third member P13 are coupled at 90° (see FIG. 4). However, the end portion P11e2 of the first member P11 and the end portion P13e of the third member P13 may be arranged at another angle such as 80° or 70°. The end portion of the first member and the end portion of the member having rigidity higher than the rigidity of the first member may cross at an angle larger than 90° such as 120° or 140° (see θ1 in FIG. 3).

D. Still Other Aspects (1) According to an aspect of the present disclosure, a robot is provided. The robot includes: an arm configured to turn around a turning axis; and a cover including a first member having first rigidity and a second member having second rigidity higher than the first rigidity, the cover being provided in the arm, the second member being located in a position closer to the turning axis than an outermost periphery of the first member in a plan view from a position along the turning axis.

According to the aspect, when the arm is brought into contact with another object by the turning of the arm around the turning axis, it is possible to reduce likelihood that the second member comes into contact with the other object. As a result, in a SCARA robot including, in a part, a part formed of a material having high rigidity, it is possible to reduce likelihood that an object present around the SCARA robot is broken.

(2) In the SCARA robot according to the aspect, the second member may include a teaching operation section used to teach a position of the arm.

At least a part of the teaching operation section of the robot is formed of a material having rigidity higher than rigidity of a material forming the first member in order to clearly specify that the teaching operation section is turned on. According to the aspect, when the arm is rotated around the turning axis, likelihood that the teaching operation section having the high rigidity comes into contact with another object can be set lower than likelihood that the first member having the lower rigidity comes into contact with the other object. As a result, in the SCARA robot including the teaching operation section, it is possible to reduce likelihood that the object present around the SCARA robot is broken.

(3) In the SCARA robot according to the aspect, the second member may include a projecting part, the projecting part may project in a direction away from the turning axis, and the teaching operation section may be provided in the projecting part.

According to the aspect, a user operates the teaching operation section provided in the projecting part. As a result, operation in teaching a position to the SCARA robot is facilitated.

(4) In the SCARA robot according to the aspect, the SCARA robot may further include: an operation control device; and a force detecting section that can detect force directly or indirectly applied to the arm, and the teaching operation section may include an operation section used to switch an teaching operation mode by a teaching pendant that transmits a teaching point to the operation control device and an teaching operation mode by direct teach performed based on an output from the force detecting section.

According to the aspect, the user can operate the operation section, start the operation mode for performing the direct teach and, in the operation mode for performing the direct teach, hold the projecting part, arrange the arm in a desirable position, and perform teaching. As a result, operation in teaching a position to the SCARA robot is facilitated.

(5) In the SCARA robot according to the aspect, the SCARA robot may further include a shaft configured to move in a direction parallel to the turning axis with respect to the arm, and the second member may include a portion located between the shaft and the outermost periphery of the first member in the plan view from the position along the turning axis.

According to the aspect, the user can easily visually recognize the second member from an outside of a reachable range of the distal end of the arm irrespective of an angle position of the arm. The user can touch the second member without moving to a position between the distal end of the arm and the base of the SCARA robot. Accordingly, by providing a user interface in the second member, it is possible to easily exchange information between the SCARA robot and the user.

(6) In the SCARA robot according to the aspect, an end portion of the first member and an end portion of the second member may cross at an angle larger than 90° in the plan view from the position along the turning axis.

According to the aspect, it is possible to reduce likelihood that the object present around the SCARA robot is broken by a coupling part of the end portion of the first member and the end portion of the second member.

(7) In the SCARA robot according to the aspect, an end portion of the first member and an end portion of the second member cross at an angle equal to or smaller than 90° in the plan view from the position along the turning axis.

According to the aspect, it is possible to reduce likelihood that the object present around the SCARA robot comes into contact with the second member.

According to an aspect of the present disclosure, a SCARA robot is provided. The SCARA robot includes an arm on which a cover is provided, the arm turning around a turning axis. The cover includes a first member having first rigidity and a second member having second rigidity higher than the first rigidity. The second member is located further on the turning axis side than a part in an outermost periphery of the first member when viewed from a direction of the turning axis.

According to the aspect, when the arm is brought into contact with another object by the turning of the arm around the turning axis, it is possible to reduce likelihood that the second member comes into contact with the other object. As a result, in a SCARA robot including, in a part, a part formed of a material having high rigidity, it is possible to reduce likelihood that an object present around the SCARA robot is broken.

In the SCARA robot according to the aspect, the second member may include a teaching operation section for teaching a position of the arm.

At least a part of the teaching operation section of the robot is formed of a material having rigidity higher than rigidity of a material forming the first member in order to clearly specify that the teaching operation section is turned on. According to the aspect, when the arm is rotated around the turning axis, likelihood that the teaching operation section having the high rigidity comes into contact with another object can be set lower than likelihood that the first member having the lower rigidity comes into contact with the other object. As a result, in the SCARA robot including the teaching operation section, it is possible to reduce likelihood that the object present around the SCARA robot is broken.

In the SCARA robot according to the aspect, the second member may include a projecting part, the projecting part may project in a direction away from the turning axis compared with a part included in the second member and surrounding the projecting part, and at least a part of the teaching operation section may be provided in the projecting part.

According to the aspect, a user operates the teaching operation section provided in the projecting part. As a result, operation in teaching a position to the SCARA robot is facilitated.

In the SCARA robot according to the aspect, the SCARA robot may further include a force detecting section that can detect force directly or indirectly applied to the arm, and the teaching operation section may include an operation section configured to start an operation mode for performing direct teach based on an output from the force detecting section.

According to the aspect, the user can operate the operation section, start the operation mode for performing the direct teach and, in the operation mode for performing the direct teach, hold the projecting part projecting compared with a part around the projecting part, arrange the arm in a desirable position, and perform teaching. As a result, operation in teaching a position to the SCARA robot is facilitated.

In the SCARA robot according to the aspect, the SCARA robot may further include a shaft configured to move in a direction parallel to the turning axis with respect to the arm, and the second member may include a portion located between the shaft and a part in the outermost periphery of the first member when viewed from a direction of the turning axis.

According to the aspect, the user can easily visually recognize the second member from an outside of a reachable range of the distal end of the arm irrespective of an angle position of the arm. The user can touch the second member without moving to a position between the distal end of the arm and the base of the SCARA robot. Accordingly, by providing a user interface in the second member, it is possible to easily exchange information between the SCARA robot and the user.

In the SCARA robot according to the aspect, the SCARA robot may include a part where an end portion of the first member and an end portion of the second member are arranged at an angle larger than 90°.

According to the aspect, it is possible to reduce likelihood that the object present around the SCARA robot is broken by a coupling part of the end portion of the first member and the end portion of the second member.

In the SCARA robot according to the aspect, the SCARA robot may include a part where an end portion of the first member and an end portion of the second member are arranged at an angle equal to or smaller than 90°.

According to the aspect, it is possible to reduce likelihood that the object present around the SCARA robot comes into contact with the second member.

The present disclosure can also be realized in various forms other than the robot. For example, the present disclosure can be realized in forms of an arm of the robot, an arm element configuring the arm of the robot, and a manufacturing method for the robot.

Not all of a plurality of constituent elements in the aspects of the present disclosure are essential. A part of the plurality of constituent elements can be changed, deleted, or replaced with new other constituent elements or a part of limited contents of the constituent elements can be deleted as appropriate in order to solve a part or all of the problems described above or achieve a part or all of the effects described in this specification. A part or all of technical features included in an aspect of the present disclosure may be combined with a part or all of the technical features included in another aspect of the present disclosure to form an independent aspect of the present disclosure in order to solve a part or all of the problems described above or achieve a part or all of the effects described in this specification.

What is claimed is:

1. A SCARA robot comprising:
   an arm configured to turn around a turning axis; and
   a cover including a first member having first rigidity and a second member having second rigidity higher than the first rigidity, the cover being provided on the arm, the second member being located in a position closer to the turning axis than an outermost periphery of the first member in a plan view from a direction of the turning axis.

2. The SCARA robot according to claim 1, wherein the second member includes a teaching operation section used to teach a position of the arm.

3. The SCARA robot according to claim 2, wherein
the second member includes a projecting part,
the projecting part projects in a direction away from the turning axis, and
the teaching operation section is provided in the projecting part.

4. The SCARA robot according to claim 3, further comprising:
an operation control device; and
a force detecting section configured to detect force directly or indirectly applied to the arm, wherein
the teaching operation section includes an operation section used to switch a teaching operation mode by a teaching pendant that transmits a teaching point to the operation control device and a teaching operation mode by direct teach performed based on an output from the force detecting section.

5. The SCARA robot according to claim 1, further comprising a shaft configured to move in a direction parallel to the turning axis with respect to the arm, wherein
the second member includes a portion located between the shaft and the outermost periphery of the first member in the plan view from the direction of the turning axis.

6. The SCARA robot according to claim 1, wherein an end portion of the first member and an end portion of the second member cross at an angle larger than 90° in the plan view from the direction of the turning axis.

7. The SCARA robot according to claim 1, wherein an end portion of the first member and an end portion of the second member cross at an angle equal to or smaller than 90° in the plan view from the direction of the turning axis.

* * * * *